United States Patent Office 2,998,366
Patented Aug. 29, 1961

2,998,366
TREATMENT OF COPPER SWEETENED DISTILLATES
Ibrahim A. Eldib, Union, and Owen K. Dell, Tabor, N.J., assignors to Esso Research and Engineering Company, a corporation of Delaware
No Drawing. Filed June 29, 1959, Ser. No. 823,319
14 Claims. (Cl. 204—162)

The present invention relates to the treatment of petroleum distillates. More specifically, the present invention contemplates the improvement of color and colorhold loss of copper sweetened distillates by exposure to light.

Petroleum fractions as produced by physical separation of the components of crude oil or as the result of primary chemical and/or catalytic conversion are not in a condition suitable for marketing. Crude oil, as well as fractions resulting from it, contain appreciable quantities of impurities which affect its odor, color stability in storage and corrosive properties.

In order to remove objectionable odors arising from the presence of sulfur compounds such as mercaptans, various sweetening processes have been developed. Among these are doctor sweetening, which consists of treating the oil fractions with sodium plumbite and sulfur, hypochlorite sweetening and copper chloride sweetening. Copper chloride sweetening has fast replaced many of the other mentioned processes because of its low cost and excellent operability. Hypochlorite and doctor sweetened products, for example, leave residues which degrade product quality. It has been found, however, that residual oil-soluble copper compounds accelerate markedly reactions which degrade the color of certain distillates, e.g. those from highly naphthenic crudes.

Briefly, it has been found that the exposure of the copper sweetened product to electromagnetic waves, preferably light in the ultraviolet range, improves the color and color stability of the sweetened distillates. X-rays and visible light waves may also be used. This process is of universal applicability; it can be applied to all petroleum distillates regardless of source or boiling range.

Other methods for improving color and colorhold loss after copper chloride sweetening have proved to be expensive or unworkable. For example, percolation over Attapulgus clay or alumina is uneconomical because of short adsorbent life, and sodium sulfide after washing has little effect on stocks derived from certain western hemisphere, highly naphthenic crudes, e.g. West Texas stock.

The copper chloride process is used for sweetening virgin and cracked naphthas. The chemical reagents employed in the process are cupric chloride and oxygen. The cupric salt oxidizes mercaptans to disulfides while it is reduced to the cuprous state. Because of the presence of the added oxygen, regeneration is accomplished simultaneously by oxidation of the cuprous compound to the cupric state. The reactions are as follows:

SWEETENING (1) $4RSH + 4CuCl_2 \rightarrow 2RSSR + 4CuCl + 4HCl$

REGENERATION (2) $4CuCl + 4HCl + O_2 \rightarrow 4CuCl_2 + 2H_2O$

OVERALL REACTION (3) $4RSH + O_2 \rightarrow 2RSSR + 2H_2O$

Copper chloride sweetening is operated as a continuous process. Several variations are applied commercially. The reagent usually consists of cupric chloride (or a mixture of cupric sulfate and sodium chloride) with clay as an inert carrier. Aqueous solutions of cupric chloride are also used but these are quite corrosive. In commercial operation, naphtha and oxygen are either mixed with the solid reagent (slurry process) or are percolated through a fixed bed. The treating sequence is as follows:

(1) The feed naphtha is first caustic prewashed. This assures the absence of hydrogen sulfide and reduces the concentration of phenols and mercaptans. Hydrogen sulfide, if present, will result in the formation of copper sulfide which is not regenerable and thus would waste the reagent.

(2) The naphtha is then water washed to remove traces of caustic. If allowed to remain in the feed, caustic would neutralize the hydrochloric acid formed in the sweetening reaction and prevent reagent regeneration (Equation 2).

(3) The prewashed feed is dried by passage over rock salt. This step is important in the slurry process to assure that water formed in the subsequent sweetening reaction (Equation 3) can be dissolved in the naphtha. Otherwise, the water would be absorbed by the clay which then would agglomerate and plug transfer lines.

(4) The naphtha is mixed with oxygen and a slurry of the solid reagent. Sweetening, which is rapid, occurs in the transfer line to a cone-bottomed settler. The slurry from the bottom of the settler is then reused in the sweetening operation.

(5) The effluent naphtha is water washed.

(6) Metal deactivator is finally added. Copper is an active oxidation promoter and in amounts over about 0.03 p.p.m. tends to accelerate gum formation. Trace amounts of copper up to about 1–2 p.p.m. are effectively neutralized by the formation of chelate complexes with the deactivator.

The above principles also apply in general to the fixed bed operation although several variations are in operation.

Color of distillates is conventionally measured by means of light transmission. This is generally done by either (1) measuring the depth of the test sample required to match a given color standard, or (2) by selecting from a series of color standards the one that most nearly matches the color of a specified depth of sample. The former is illustrated by the Saybolt method which uses the Saybolt chromometer (ASTM D–156) and is used to measure the color of light distillates, while the Tag-Robinson colorimeter, an example of the latter method, is used to measure the color of distillates of the darker types. The procedures employed in these tests are fully described in Wilhelm, Tag Manual, C. J. Tagliabue Mfg. Co., 25th ed., Brooklyn, N.Y. (1939), pp. 54–62. In order to more readily compare the Saybolt and Tag-Robinson color, the following absolute scale has been devised:

| Saybolt Color | Absolute Scale | Tag-Robinson Color | Absolute Scale | Tag-Robinson Color | Absolute Scale |
|---|---|---|---|---|---|
| | | Disc #3 | | | |
| 30 | 0.50 | 21 | 10.8 | 11 | 110 |
| 29 | 0.56 | 20¾ | 11.3 | 10¾ | 118 |
| 28 | 0.62 | 20½ | 12.0 | 10½ | 130 |
| 27 | 0.71 | 20¼ | 12.75 | 10¼ | 145 |
| 26 | 0.85 | 20 | 13.5 | 10 | 162 |
| 25 | 1.00 | 19¾ | 14.5 | 9¾ | 185 |
| 24 | 1.11 | 19½ | 15.6 | 9½ | 220 |
| 23 | 1.25 | 19¼ | 17.0 | 9¼ | 255 |
| 22 | 1.43 | 19 | 18 | 9 | 310 |
| 21 | 1.66 | 18¾ | 20 | Disc #1 | |
| 20 | 1.86 | 18½ | 22 | 8¾ | 330 |
| 19 | 2.11 | 18¼ | 24 | 8½ | 340 |
| 18 | 2.42 | 18 | 27 | 8¼ | 345 |
| 17 | 2.76 | 17¾ | 31 | 8 | 355 |
| 16 | 3.20 | 17½ | 36 | 7¾ | 365 |
| 15 | 3.43 | 17¼ | 43 | 7½ | 375 |
| 14 | 3.69 | 17 | 54 | 7¼ | 385 |
| 13 | 4.00 | Disc #2 | | 7 | 400 |
| 12 | 4.36 | 17¾ | 33 | 6¾ | 410 |
| 11 | 4.64 | 17½ | 34 | 6½ | 425 |
| 10 | 4.98 | 17¼ | 35 | 6¼ | 440 |
| 9 | 5.33 | 17 | 36 | 6 | 445 |
| 8 | 5.54 | 16¾ | 37 | 5¾ | 480 |
| 7 | 5.76 | 16½ | 38 | 5½ | 500 |
| 6 | 6.00 | 16¼ | 39.5 | 5¼ | 530 |
| 5 | 6.28 | 16 | 41 | 5 | 560 |
| 4 | 6.54 | 15¾ | 42 | 4¾ | 590 |
| 3 | 6.86 | 15½ | 43.5 | 4½ | 620 |
| 2 | 7.20 | 15¼ | 45 | 4¼ | 660 |
| 1 | 7.52 | 15 | 47 | 4 | 700 |
| 0 | 8.00 | 14¾ | 48.5 | 3¾ | 740 |
| −1 | 8.47 | 14½ | 50 | 3½ | 800 |
| −2 | 9.00 | 14¼ | 52 | 3¼ | 880 |
| −3 | 9.60 | 14 | 54 | 3 | 930 |
| −4 | 9.93 | 13¾ | 57 | 2¾ | 1020 |
| −5 | 10.29 | 13½ | 60 | 2½ | 1110 |
| −6 | 10.67 | 13¼ | 62 | 2¼ | 1240 |
| −7 | 11.08 | 13 | 65 | 2 | 1400 |
| −8 | 11.52 | 12¾ | 70 | 1¾ | 1550 |
| −9 | 12.00 | 12½ | 73 | 1½ | 1800 |
| −10 | 12.52 | 12¼ | 77 | 1¼ | 2150 |
| −11 | 13.09 | 12 | 81 | 1 | 2750 |
| −12 | 13.17 | 11¾ | 87 | | |
| −13 | 14.40 | 11½ | 93 | | |
| −14 | 15.16 | 11¼ | 100 | | |
| −15 | 16.00 | | | | |
| −16 | 17.00 | | | | |

To evaluate color stability, the 16-hour colorhold test is employed. In this test the distillate is tested for color after it is heated at 212° F. for 16 hours.

Most effective color and colorhold improvement is obtained by exposure to light sources containing appreciable amounts of ultraviolet light. This includes wave lengths of from about 2000 to 4400 angstroms. Various light sources may be used. The best source of continuous ultraviolet radiation is the hydrogen discharge tube. Other sources include the vapor lamp and the carbon arc lamp. Sunlight and the ordinary tungsten filament lamp also admit appreciable amounts of light in the above range.

The wavelengths of the various electromagnetic waves discussed herein are shown in the following table:[1]

| Type of Radiation | Wavelength (Angstroms) |
|---|---|
| X-Rays | 0.1–100 |
| Ultraviolet, below | 4,000 |
| Visible light | 4,000–7,000 |
| Infra-red, greater than | 7,000 |

The time of exposure is dependent on the wave length and intensity of the light source used. Another variable is the thickness of the oil layer exposed. Wave lengths in the ultraviolet range, intense light sources and thin oil layers all tend to reduce the required time of exposure. When a carbon arc lamp is used as the light source, exposure should be for at least 5 minutes and for less than about 60 minutes, preferably from about 10 to 30 minutes. In the case of sunlight, exposure should be for at least 30 minutes, preferably at least 90 minutes.

The degradation of color after copper chloride treating may be explained as follows: The oxygen used for regeneration (see equation (2) supra) reacts with a hydrocarbon such as naphthene to yield a free radical which absorbs light in the visible range and therefore produces a color effect.

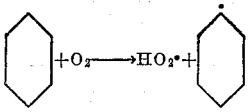

The HO$_2$· radical then reacts with other hydrocarbons in the oil, e.g. paraffins, to yield oxygenated compounds. This is evidenced by the fact that both non-washed and caustic prewashed stocks show an increase in material containing carbonyl groups as a result of continued copper sweetening. When the sweetened product containing traces of cupric chloride is irradiated by light a radical ion and a free radical are formed.

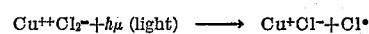

Either one of the two ions produced, i.e.

can recombine with the naphthene radical,

forming a non-free radical which does not absorb light and, therefore, gives no color effect.

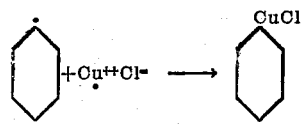

or

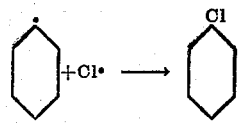

Example 1

A West Texas light heating oil was copper sweetened under the following conditions:

Catalyst loading—0.35 gms. mercaptan S/hr./lb. of catalyst.
Air rate—10 times the amount required to oxidize the mercaptans to disulfides.
Reactor temperature—90–100° F.
Reactor pressure—Atmospheric.

The sweetened product was degraded in both color and colorhold as shown below:

TABLE I

| | Color | | Colorhold | |
|---|---|---|---|---|
| | Color Scale | Absolute | Color Scale | Absolute |
| Before CuCl$_2$ Treat | +19S | 2.11 | 17S | 2.76 |
| After CuCl$_2$ Treat | 17½TR | 34 | 17¾TR | 31 |

---
[1] "Handbook of Chemistry and Physics," 35th ed., Chemical Rubber Pub. Co. (1953) p. 2466.

TR throughout the specification refers to the reading on a Tag Robinson colorimeter disc #3 while S indicates the reading on a Saybolt chromometer. It should be noted that in this example the stock was not caustic washed prior to sweetening.

*Example 2*

A 200 cc. sample of the stock sweetened under the conditions described in Example 1 was placed in a 500 ml. Erlenmeyer flask. The flask was placed in a closed chamber and irradiated with a carbon arc for 15 minutes. A second sample was exposed to sunlight by placing the liquid in a flask outdoors in a spot where the direct sunlight could readily reach it for 4 hours. The color and the colorhold of the sweetened stock and the two samples exposed to visible and ultraviolet light in accordance with the invention are shown in the following table:

TABLE II

| Light Source | Color | | Colorhold | |
| --- | --- | --- | --- | --- |
|  | Color Scale | Absolute | Color Scale | Absolute |
| None | 17½TR | 34 | 17¾TR | 31 |
| Carbon Arc | −13S | 14.4 | 19TR | 18 |
| Sunlight | −15S | 16 | 18½TR | 22 |

Marked improvements in both color and colorhold, after exposure to the light sources, are readily apparent from the data. The greater improvement in the shorter exposure time obtained by using the arc lamp is a result of a greater intensity of the requisite light frequency.

*Example 3*

West Texas light heating oil was caustic washed and then water washed prior to copper chloride sweetening. The sweetening was performed as described in Example 1. Separate samples of the sweetened stock were exposed respectively to sun, infrared light from a rare earth oxides glow and to a carbon arc. The time of exposure is indicated in parenthesis. The following results were obtained.

TABLE III

| Light Source | Color | | Colorhold | |
| --- | --- | --- | --- | --- |
|  | Color Scale | Absolute | Color Scale | Absolute |
| None | 18.5TR | 22 | 17.5TR | 36 |
| Infrared light (4 hrs.) | 18.5TR | 22 | 17.5TR | 22 |
| Sunlight (4 hrs.) | 5S | 6.28 | 18.75TR | 22 |
| Carbon Arc (15 min.) | −1S | 8.47 | 19.25TR | 17 |

The above data show that in order to improve the color and colorhold properties of the heating oil, the light must be in the visible or ultraviolet range. This is evidenced by the fact that no improvement in color or colorhold was obtained by exposure to infrared light.

In some cases the use of a metal deactivator as an additive, either before or after exposure to light, improves the color and colorhold properties.

*Example 4*

Samples of copper sweetened stock, with and without prior caustic wash, were exposed to sunlight and a carbon arc lamp. The efficacy of the addition of two pounds of metal deactivator per 100 barrels of heating oil both before and after exposure to light was tested. The following table indicates the effect of the additive.

TABLE IV

| Light Source | Additive | Caustic Pretreat | Color | | Colorhold | |
| --- | --- | --- | --- | --- | --- | --- |
|  |  |  | Color Scale | Abs. | Color Scale | Abs. |
| Sunlight (4 hrs.) | None | Yes | 5S | 6.28 | 18.75TR | 22 |
| Do | After | Yes | −5S | 10.3 | 19.75TR | 14.5 |
| Sunlight (2 hrs.) | Before | Yes | +2S | 7.2 | 20.25TR | 12.75 |
| Sunlight (4 hrs.) | None | No | −15S | 16 | 18.50TR | 22 |
| Do | Before | No | −9S | 12 | 19.25TR | 17 |
| Carbon Arc (15 Min.) | None | Yes | −1S | 8.47 | 19.25TR | 17 |
| Do | After | Yes | −2S | 9 | −15S | 16 |
| Do | Before | Yes | −1S | 8.47 | −15S | 16 |
| Carbon Arc (45 min.) | None | Yes | −13S | 14.4 | 18.75TR | 20 |
| Do | Before | Yes | −1S | 8.5 | 20.5TR | 12 |
| Carbon Arc (15 min.) | None | No | −13S | 14.4 | 19TR | 18 |
| Do | After | No | −16S | 17 | 19.25TR | 17 |
| Do | Before | No | −13S | 14.4 | 19.25TR | 15.6 |

The above data show that the addition of an additive both before and after exposure to light improves the colorhold property. Addition of the additive prior to exposure, however, gives the greatest improvement.

*Example 5*

To determine the optimum exposure time for a carbon arc lamp, three samples of sweetened oil prepared in accordance with Example 2 were exposed to a carbon arc. Tests were made at 15, 45 and 90 minutes.

TABLE V

| Light Source | Color | | Colorhold | |
| --- | --- | --- | --- | --- |
|  | Color Scale | Absolute | Color Scale | Absolute |
| Carbon Arc (15 min.) | −1S | 8.47 | 19.25TR | 17 |
| Carbon Arc (45 min.) | −13S | 14.4 | 18.75TR | 20 |
| Carbon Arc (90 min.) | −2S | 9 | 13.5TR | 60 |

Excessive exposure to the carbon arc showed severe degradation of the color stability. This indicates that there is a time of exposure after which there is sharp decline in color stability.

The type of metal deactivator used above was di-salicyl 1,2-diamino propane. This compound can be purchased in commercial quantities and is prepared by condensing 2 molecules of di-amino propane. The amount of additive used is in the range of from about 0.5 to 10 pounds per 1000 barrels oil, preferably about 2 pounds per 1000 barrels. Other metal deactivators can be used. They may be gaseous, liquid, or solid.

The above examples are only illustrative of the instant invention and should not be deemed definitive. Many modifications are within the scope of the instant invention. For instance, the color degraded product could be sprayed on a flat plate which is exposed to the light source. The rate of spraying should be controlled to permit variation in the thickness of the oil layer. A thinner layer gives more effective exposure.

In another modification, the sweetened distillate may be passed through a finned tube through which the light source could penetrate. Many other schemes for exposure to light may, of course, be used.

What is claimed is:
1. A process for the production of sweetened distillates with improved color and color hold properties which comprises: treating a sulfur containing distillate with a reagent containing cupric ions and chloride ions, thereby forming visible light absorbing free radicals and insoluble sulfur compounds; separating said insoluble sulfur compounds from said treated distillate containing said visible, light absorbing free radicals; exposing said distillate to an electromagnetic radiation having a wave length less than about 7,000 A. for a period sufficient to convert a substantial amount of said free radicals to non-light absorbing, non-free radicals; and discontinuing said exposure prior to the degradation of the treated distillate.

2. The process of claim 1 wherein said electromagnetic radiation is ultraviolet light.

3. The process of claim 1 wherein said electromagnetic radiation is visible light.

4. The process of claim 1 wherein said electromagnetic radiation is light of wave lengths from about 2000 to 4400 angstroms.

5. The process of claim 1 wherein said electromagnetic radiation is sunlight and the time of exposure is for at least 30 minutes.

6. The process of claim 1 wherein the source of said electromagnetic radiation is sunlight and the time of exposure is for at least 90 minutes.

7. The process of claim 1 wherein the source of said electromagnetic radiation is a carbon arc and the time of exposure is from about 5 minutes to about 60 minutes.

8. The process of claim 1 wherein the source of said electromagnetic radiation is a carbon arc and the time of exposure is from about 10 minutes to about 30 minutes.

9. The process of claim 1 wherein said sweetened distillate is washed with caustic prior to sweetening.

10. The process of claim 1 wherein a metal deactivator is added prior to the exposure to the said electromagnetic wave.

11. The process of claim 1 wherein a metal deactivator is added subsequently to exposure to the electromagnetic radiation.

12. The process of claim 10 wherein 0.5 to 10 lbs. of said metal deactivator are added to 1000 barrels of said copper sweetened distillate.

13. The process of claim 10 wherein about 2 lbs. of said metal deactivator are added per 1,000 barrels of copper sweetened distillate.

14. The process of claim 10 wherein said metal deactivator is disalicyl 1,2-diamino propane.

References Cited in the file of this patent

UNITED STATES PATENTS

| | | |
|---|---|---|
| 1,551,806 | Davis | Sept. 1, 1925 |
| 1,904,382 | Morrell | Apr. 18, 1933 |
| 2,768,885 | Kalinowski et al. | Oct. 30, 1956 |